UNITED STATES PATENT OFFICE.

FRITZ BENDER, OF MÜHLHEIM, GERMANY, ASSIGNOR TO A. LEONHARDT & CO., OF SAME PLACE.

PINK DYE.

SPECIFICATION forming part of Letters Patent No. 445,684, dated February 3, 1891.

Application filed July 25, 1890. Serial No. 359,916. (No model.) Patented in France August 24, 1889, No. 200,401.

*To all whom it may concern:*

Be it known that I, FRITZ BENDER, a subject of the Emperor of Germany, resident at Mühlheim, near Frankfort-on-the-Main, (assignor to the firm of A. LEONHARDT & CO., of said Mühlheim,) have invented new and useful Improvements in Coloring-Matter, (for which I have obtained a patent in France, No. 200,401, dated August 24, 1889,) of which the following is a specification.

If formaldehyde is allowed to react upon dimethyl or diethylmeta-amidophenol at the ordinary temperature, there are formed colorless products of condensation—namely, tetramethyl tetraethyldiamidodioxydiphenylmethane. These products of condensation when heated with suitable dehydrating agents undergo under elimination of water a further condensation.

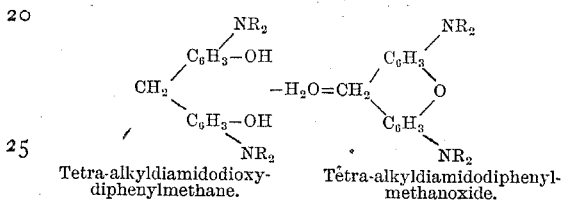

Tetra-alkyldiamidodioxy-  Tetra-alkyldiamidodiphenyl-
diphenylmethane.          methanoxide.

In this stage already to a small extent the formation of color can generally be observed. The color, however, becomes the principal product of reaction if the above-named oxides are subsequently subjected to an oxidation. In this manner beautiful pink dye-stuffs are obtained, the watery and alcoholic solutions of which show a magnificent fluorescence and which are excellently adapted for the dyeing or printing of cotton. By this property they distinguish themselves favorably from the dye-stuffs of similar shade. The so-called "rhodamines," which especially for tinting the cotton fiber, are of less value.

Hereinafter I give an exact description of the manner in which this invention is to be carried out.

*First stage. Manufacture of tetra-alkyldiamidodioxydiphenylmethane.*

Example 1.—A solution of twenty-eight kilos dimethylmetamidophenol in two hundred liters alcohol of sixty per cent. about is digested with an aqueous solution of three kilos formaldehyde of thirty per cent. After prolonged standing at the ordinary temperature the formed product of condensation separates from the mother-lye. It forms small shiny leaves at the melting-point 180° and possesses basic as well as acid properties. From its solution in hydrochloric acid precipitation can be effected by means of soda from its solution in caustic-soda lye by means of acetic acid.

Example 2.—Fourteen kilos dimethylmetamidophenol are dissolved in sixty liters water and eleven kilos concentrated muriatic acid, and the solution is digested cold with 3.8 kilos of a solution of formaldehyde of forty per cent. If after a prolonged standing the smell of aldehyde has disappeared, the solution is diluted to a volume of about two hundred liters, then heated to 60° centigrade, and then a gradual precipitation by means of soda is effected, whereby first some impurities are precipitated, and then from the filtrate the tetramethyldiamidodioxydiphenylmethane formed by condensation, which can be purified by crystallization from diluted alcohol.

Example 3.—Sixteen kilos diethylmetamidophenol are dissolved in twelve kilos caustic lye of thirty-three per cent. and eighty liters of water, and the cold solution is digested with 3.8 kilos of a solution of formaldehyde of forty per cent. If after a prolonged standing the smell of aldehyde has disappeared, the solution is diluted up to a volume of two hundred liters and heated to 50° centigrade. Hereafter by diluted acetic acid precipitation is effected, first of some impurities and then from the filtrate of the formed tetraethyldiamidodioxydiphenylmethane, which can be easily obtained in a quite pure state by crystallization in diluted alcohol. The melting-point lies at 164° centigrade, and in its chemical properties it is quite similar to the above-described tetramethyl derivative.

*Second stage. Manufacture of tetra-alkyldiamidodiphenylmethane oxide.*

Ten kilos of one of the products of condensation obtained in the first stage are heated to about 100° centigrade with fifty kilos ordinary concentrated sulphuric acid. The mass gets thereby dissolved and takes a yellow color. The end of the reaction can be tested by pouring a sample into water, where it must dissolve with a light pink color and a yellowish fluorescence, and after oversaturating with caustic-soda lye and filtering the filtrate, on the addition of acetic acid, must show either no or an insignificant precipitation. The oxides thus obtained can be isolated by pouring the whole mass into cooled water and precipitating with caustic-soda lye. They do not possess any acid properties, but are of a quite basic nature. Among the dehydrating agents which I have employed, I have found sulphuric acid to be the best, but chloride of zinc and a little muriatic acid would also do.

*Third stage. Production of the dye-stuffs.*

For the oxidation of the oxides described under second stage most of the usual oxidizing agents can be employed. I mention as example nitrous acid, peroxide of lead, sesqui-chloride of iron, the last rendering the best results.

Example.—A solution of ten kilos tetraethyldiamidodiphenylmethane oxide in two hundred liters about of diluted sulphuric acid of twenty per cent. (such a solution can be obtained by simply mixing the mass obtained in the second stage with water) is digested with thirty liters solution of sesqui-chloride of iron (of 1.14 specific gravity) and one hundred and fifty liters solution of chloride of zinc, (specific gravity 1.41.) The whole is then heated for about twelve hours at about 90° centigrade until the formation of the coloring-matter is finished. After cooling the dye-stuff is separated by filtering and well washed with a solution of salt. The oxidation by means of peroxide of lead or nitrite must be operated in a weak acid solution and in the cold.

Example: 2.7 kilos tetramethyldiamidodiphenylmethaneoxide are dissolved hot in one hundred and twenty liters water and four kilos concentrated muriatic acid. The whole mass must always be kept slightly aciduous, and after cooling an aqueous solution of nitrite is added in the cold as long as any formation of coloring-matter can be observed, which can be tested by precipitating a sample and filtering it. If the filtrate on addition of nitrite shows no further formation of coloring-matter the reaction is finished. This operation requires about 0.8 kilo nitrite. The coloring-matter obtained is then precipitated with chloride of zinc and salt and purified by crystallization in presence of chloride of zinc.

The methylated dye-stuff possesses almost the same properties as the ethylated, the latter yielding tints of a little more bluish shade. Both of them form beautiful crystals or a crystalline powder, which dissolves easily in water or spirit, giving a beautiful red solution, which shows a magnificent yellowish fluorescence. If the watery solution is treated with soda-lye, the free base of the coloring-matter separates in the form of a reddish violet precipitate. The dye-stuff if dissolved in concentrated sulphuric acid gives an orange solution, which when diluted with much water turns into bluish red.

I claim—

1. The herein-described improvement in the art of obtaining pink coloring-matters, consisting in treating tetramethyl or tetraethyl diamidodiphenylmethane oxide with oxidizing agents.

2. The herein-described improvement in the art of obtaining pink coloring-matters by treating tetramethyl or tetraethyl amidodioxydiphenylmethane with dehydrating agents, in order to produce tetramethyl or tetraethyl diamidodiphenylmethane oxide, and treating the latter with oxidizing agents.

3. The herein-described improvement in the art of obtaining pink coloring-matters by treating dimethyl or diethyl meta-amidophenol with formaldehyde in order to produce tetramethyl or tetraethyl diamidodioxydiphenylmethane, treating the latter with dehydrating agents in order to produce tetramethyl or tetraethyl diamidodiphenylmethane oxide, and treating the latter with oxidizing agents.

4. The basic coloring-matters herein described, consisting of crystals or a crystalline powder dissolving easily in water or spirits, giving a beautiful red solution showing a brilliant yellowish fluorescence and having the properties that its watery solution when treated with soda-lye allow the free base of the coloring-matter to separate in the form of a reddish-violet precipitate, and that when it is dissolved in concentrated sulphuric acid it gives an orange solution, which when diluted with much water turns to bluish red.

In testimony whereof I have signed my name to this specification in the presence of two subscribing witnesses.

FRITZ BENDER.

Witnesses:
FRANZ WIRTH,
FRANZ HASSLACHER.